United States Patent
Cassarly et al.

[19]

[11] Patent Number: 5,924,792
[45] Date of Patent: Jul. 20, 1999

[54] MODULAR DUAL PORT CENTRAL LIGHTING SYSTEM

[75] Inventors: William J. Cassarly; John M. Davenport, both of Lyndhurst; Richard L. Hansler, Pepper Pike, all of Ohio

[73] Assignee: General Electric Company, Schenectady, N.Y.

[21] Appl. No.: 08/803,948

[22] Filed: Feb. 21, 1997

Related U.S. Application Data

[51] Int. Cl.[6] ........................................................ F21V 7/04
[52] U.S. Cl. .......................... 362/554; 362/581; 362/558; 362/294; 362/298; 362/299; 362/373
[58] Field of Search .............................. 362/32, 294, 297, 362/298, 299, 300, 302, 304, 305, 345, 346, 373, 581, 554, 558

[56] References Cited

U.S. PATENT DOCUMENTS

| | | | |
|---|---|---|---|
| 4,241,382 | 12/1980 | Daniel | 362/346 |
| 5,416,669 | 5/1995 | Kato et al. | 362/304 |
| 5,515,242 | 5/1996 | Li | 362/32 |
| 5,755,505 | 5/1998 | Hiramatsu | 362/32 |

*Primary Examiner*—Thomas M. Sember
*Attorney, Agent, or Firm*—Fay, Sharpe, Beall, Fagan, Minnich & McKee, LLP

[57] ABSTRACT

A central lighting system for providing light to locations remote from a light source includes first and second ellipsoidally shaped reflectors joined together to surround the light source. The first and second reflectors direct the light from the light source to light guides which are fixed at a position outside of the joined together reflectors. The ellipsoidally shaped reflectors each have an opening or window along an optical axis through which the reflected light passes to the light guides. The configuration of the reflectors allows the light the be received by the light guides outside of the reflectors. A base secures the light source in a fixed position with respect to the reflectors and allows the light source and reflector module to be removed and replaced as a single unit without repositioning the light guides.

22 Claims, 3 Drawing Sheets

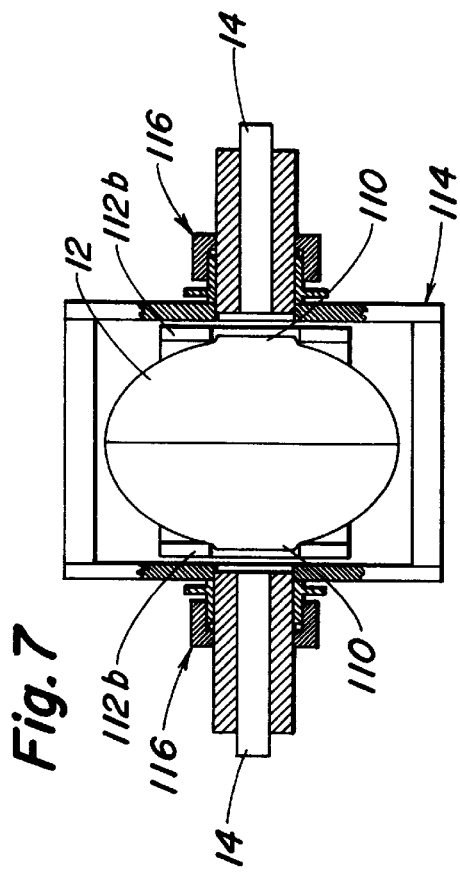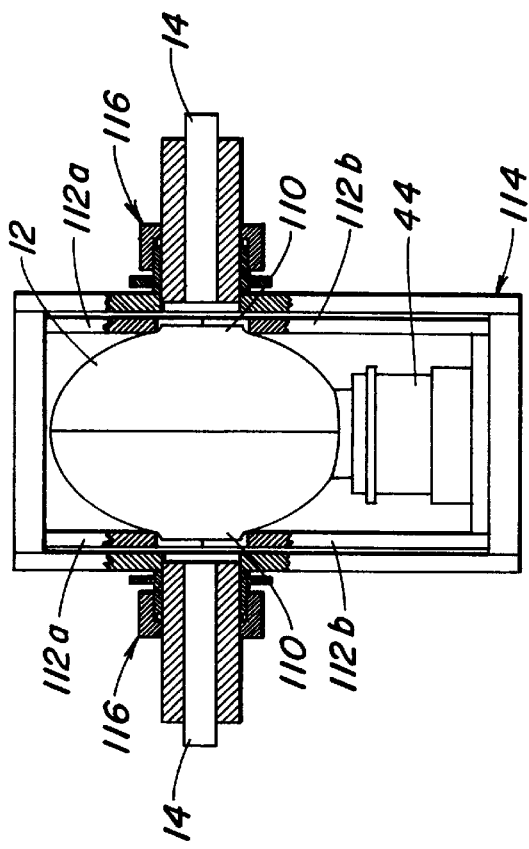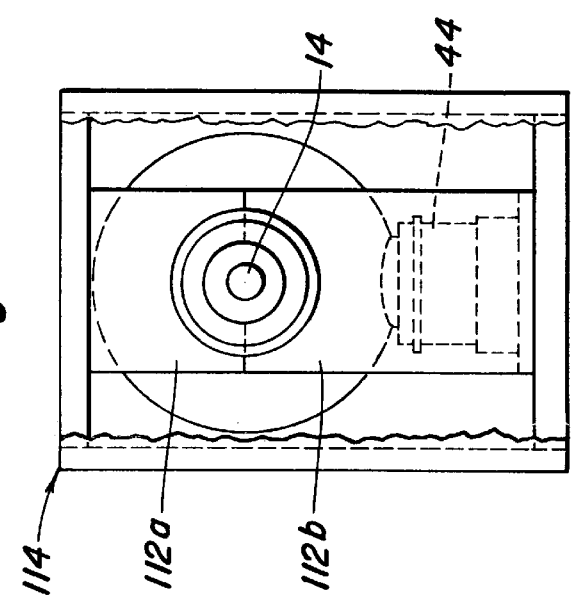

MODULAR DUAL PORT CENTRAL LIGHTING SYSTEM

BACKGROUND OF THE INVENTION

The present invention relates to an improved central lighting system and more particularly to an optical system including a light source module for delivering light to remote locations in which the light source module may be easily replaced without disassembling the optical system.

Centralized lighting systems in which a single high intensity light source is used for illumination of a number of separate remote locations are known in the art. These systems generally include a light distribution system incorporating optical light conductors, such as optical tubes, rods, or fibers, to transmit the light from the light source to the remote locations. Such central lighting systems may be used in automotive lighting applications, such as headlights, tail lights, and console lighting, as well as in display lighting for merchandizing, for home use, and in other lighting applications. One example of a centralized lighting system is disclosed in U.S. Pat. No. 4,958,263 issued to Davenport, et al. which discloses the use of a centralized lighting system to deliver light to a plurality of locations within an automobile.

The light source for use with a central lighting system is generally a high brightness light source used in conjunction with one or more reflectors which focus the light at an input end of a light distribution apparatus. One type of centralized lighting system is a dual port lighting system in which the light is focused by two reflectors into two light guides for delivery to two remote locations. Although dual port lighting systems are particularly useful for automotive headlights, they may also be used in a wide variety of other applications.

A prior art dual port lighting system is illustrated schematically in FIG. 3 and generally includes two opposed reflectors R which are spherical or ellipsoidal in shape and have openings along an optical axis. A light source L is positioned centrally at one focus of both of the reflectors. The input ends of two light guides (not shown) are located at a second focus $F_1$ of each of the reflectors. In known systems, the second focus $F_1$ of the reflectors and the input ends of the light distribution apparatus are generally located between the two opposed reflectors R or at the surfaces of the reflectors. Thus, the light guides themselves must extend partially into the reflectors.

The spacial orientation between the light source L, the reflectors R, and the input ends of the light guides is extremely important because proper spacial orientation will allow the amount of light collected by the light guides for distribution to the remote locations to be maximized. For this reason, the input ends of the light guides must be positioned within the openings in the reflectors and fixed with respect to the reflectors and the light source so that the collected light properly enters the input end of the light distribution apparatus.

When the light source burns out after extended use, the light source L must be removed and replaced. With known systems the replacement of the light source L involves the removal and replacement of a module including both the light source and the reflectors R in which the light source is mounted. This is a labor intensive process because one or both of the light guides must be removed from the openings in the reflectors in order for the light module to be removed. When the new light source is installed the light guides then must be replaced within the openings in the reflectors at the proper location to ensure the maximum amount of light is collected.

It would therefore be desirable to provide a light module which is easier to replace when burned out and to eliminate the labor intensive process of establishing the proper alignment of the various parts of the centralized lighting system after replacement of the burned out light source.

SUMMARY OF THE INVENTION

The device according to the present invention addresses the disadvantages of the prior art by providing a new and improved central lighting system with a replaceable modular light source which is easily aligned with a light distribution system.

According to one aspect of the present invention, a lighting apparatus for providing light to two remote locations includes a replaceable housing, a light source contained in the housing, and first and second reflectors arranged in the housing to receive light from the light source and direct light to two focal points located outside of the housing. First and second windows are located in the openings in the first and second reflectors for changing the angle of the light passing out of the housing. A light distribution system including input ends located outside the housing receives the light from the light source which has passed through the first and second windows. A mounting member removably receives the replaceable housing at a position in which the input ends of the light distribution system will receive the light which has passed through the first and second window without the need to move or reposition the light distribution system during replacement of the housing.

According to another aspect of the invention, a module dual-port light engine includes a one piece transparent housing member having two identical opposing ellipsoidal internal surfaces, a reflective coating substantially covering the ellipsoidal internal surfaces except for an opening at a center of each of the ellipsoidal surfaces, a negative lens formed in a wall of the transparent housing at the opening in each of the ellipsoidal surfaces for focusing light at a point outside of the housing member, an arc tube fixed within the housing at a first focal point of each of the ellipsoidal surfaces, and a base fixing the arc tube within the housing member and providing a mechanical and electrical connection to a light socket.

According to a further aspect of the invention, a light collection and distribution method is disclosed including steps of emitting light, reflecting the emitted light by two opposed ellipsoidal reflectors, passing the reflected light through two windows, collecting the light which has passed through the two windows in light guides which are fixed outside of the two opposed reflectors, and removing and replacing a module containing the light source and reflectors without moving the light guides.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, wherein:

FIG. 6 is an elevational view of a preferred manner of mounting the housing relative to the light guides;

FIG. 7 is a top plan view of the assembly of FIG. 6; and

FIG. 8 is an elevational view taken from the left-hand side of FIG. 6.

DETAILED DESCRIPTION OF THE PREFERRED EMBODIMENTS

Figure 1:
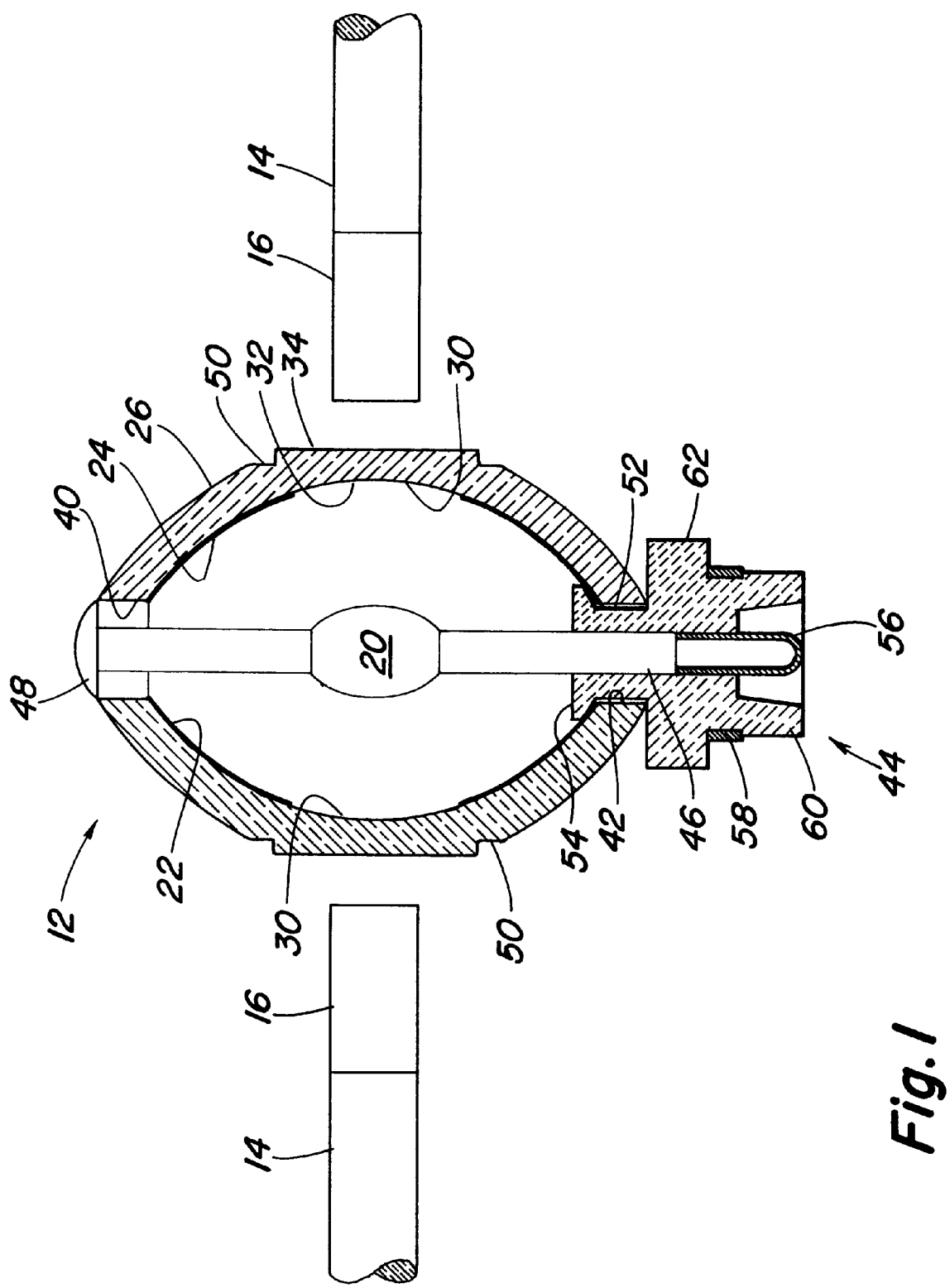
FIG. 1 is a cross sectional view of the lighting system according to a first embodiment of the present invention.

Referring now to the drawings wherein the showings are for purposes of illustrating the preferred embodiments of the invention only and not for purposes of limiting same, the FIGURES show a central lighting system including a light source module 12 for delivering light to remote locations via two light guides 14 which are positioned outside of the light source module. The particular configuration of the light source module 12 allows the light guides 14 to be mounted at a fixed position outside of the module, and allows the replacement of the module without adjusting the positions of the light guides.

The light source module 12 includes a central light source which is preferably an arc tube 20. Substantially surrounding the arc tube 20 are two identically shaped opposing reflectors 22, 24. Each of the reflectors 22, 24 is formed in the shape of a portion of an ellipsoid. The two reflectors 22, 24 are preferably formed by a single transparent glass housing 26 having the two ellipsoidal inner reflector surfaces formed by adhering a reflective film to the inner surface of the glass housing. The reflective film coating on the inner surface of the housing forming the reflectors 22, 24 is preferably an optical interference filter coating which transmits infrared and near infrared light while reflecting visible light. This infrared transmitting coating allows heat to dissipate from the lamp.

A substantially circular central opening or window 30 is provided in the reflective film of each of the reflectors 22, 24 through which reflected and non-reflected light passes out of the module 12 and into the optical couplers 16 and light guides 14 positioned at the exterior of the module. In particular, the light from the arc tube 20 is reflected off the first reflector 22, passes through the window 30 in the second reflector 24 and vice versa. The light then enters the light guide 14 via the coupler 16 located on the end of the light guide. The couplers 16 allow the light to pass into the light guides 14 for transmission to a remote location. The central axes of the substantially circular windows 30 are collinear and pass through approximately the center of the arc tube 20.

The windows 30 are preferably formed as an integral part of the reflectors by a forming process such as pressing. The window 30 may be coated with one or more ultraviolet blocking coatings to prevent damage to the light guides 14 and couplers 16 which is caused by ultraviolet light. In addition to, or in place of, ultraviolet blocking coatings on the windows 30, an ultraviolet absorbing glass may be used for the glass housing 26 and windows.

The windows 30 each have an inner curved surface 32 which acts as a negative lens to change the angle of the light passing through the window. The outer surfaces 34 of the windows 30 are substantially flat and act to focus the light. Negative lenses or windows 30 have been illustrated having concave curved surfaces 32 which are curved in two dimensions and flat surfaces 34, however, other forms of negative lenses can also be used without departing from the invention. The windows 30 reduce the angle of the light entering the couplers 16 of the optical light guides 14 and obviate the need for tapered optical coupling members on the ends of the light guides. Such tapered couplers are shown in U.S. Pat. No. 5,560,699 issued to Davenport, et al. which is incorporated herein by reference.

Figure 2:
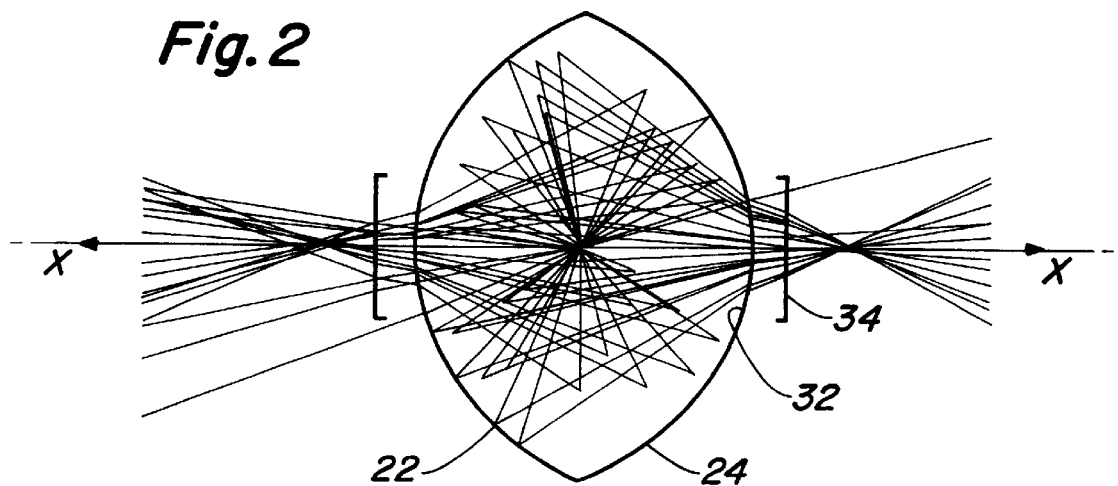
FIG. 2 is a schematic cross sectional view of the light module of FIG. 1 illustrating the light paths of the reflected light.

FIG. 2 is a schematic cross sectional view illustrating a ray tracing of the light output from the light module of FIG. 1. FIG. 2 shows the effect of the reflectors 22, 24, the inner window surface 32, and the outer window surface on the light emitted by the light source 20. In particular, the light is collected by the reflectors 22, 24 and directed through the windows 30. As the light passes through the inner window surface 32, the angle of the light with respect to an optical axis X of the reflectors is decreased. The light then passes through the outer window surface 34 which focuses the light. The window 30 causes the light to enter the light guide coupling 16 at a smaller angle with respect to the optical axis X than the angle which occurs without any lens or window. The lens effect of the window permits the use of straight coupling members 16 rather than tapered coupling members to introduce the light to the light guides.

Spaces are provided between the glass housing 26 of the light module and the ends of the optical couplers 16 and light guides 14 (FIG. 1). The spaces provide thermal isolation between the light module and the light couplers 16 and light guides 14 to prevent damage to these light transmitting members. The spaces also allow the insertion of auxiliary devices between the light module and the light transmitting members. Examples of auxiliary devices are filters, lenses, and shutters.

The arc tube 20 is mounted in the glass housing 26 of the light source module 12 in a pair of openings 40, 42 at the top and bottom of the glass housing. A base 44 is provided in the lower opening 42 for receiving the fragile glass tube 46 surrounding the anode lead of the arc tube 20 and for anchoring the arc tube in place in the glass housing 26. The base 44 provides a plug-in connection by which the light source module 12 is electrically connected to a support structure in which the lighting system is mounted. The base design fits into a socket design which is currently in use including a first central electrical contact and a second electrical contact which is radially disposed from the central electrical contact. The base 44 also provides a support for the module in the known socket design. The opposite or cathode end of the arc tube 20 extends through the top opening 40 in the glass housing 26 and is electrically connected by way of a contact 48 formed at the surface of the glass housing.

The base 44 is preferably formed of a ceramic material and includes an annular groove 52 received in the opening 42 in the glass housing 26 forming the reflectors. A flange 54 on the base 44 fits within the interior of the glass housing 26 and holds the base securely in the opening 42 of the housing. The base 44 includes a central electrical contact 56 or positive contact and an annular ring-shaped electrical contact 58 or negative contact. The ceramic base 44 prevents arcing between the central contact 56 and the ring-shaped contact 58 during the high voltage start-up due to the distance between the two contacts and the axially extending annular ridge 60 separating the contacts.

An annular ring 62 is also provided on the base 44 which shields the ring-shaped contact 58 from light from the lamp 20 which may result in sodium loss and poor lamp performance due to the insufficient electrical contact. The ring-shaped contact 58 is connected to an upper contact 48 of the arc tube 20 by a lead which is protected against physical contact from the environment by a shielding material such as a coating.

The ceramic base 44 holds the arc tube 20 in a precise location with respect to the reflectors 22, 24. The arc tube 20, reflector, and base 44 may be assembled in a number of different manners. For example, the light module 12 may be assembled by forming the glass housing 26 in multiple parts and assembling the housing around the base 44 and arc tube. The light module 12 may also be assembled by forming the base in multiple parts and fitting the base and arc tube into a one piece glass housing, or by forming the ceramic base in place in the glass housing.

The glass housing 26 also preferably includes ring shaped grooves 50 surrounding each of the windows 30 on an exterior of the housing. These grooves 50 engage corresponding ring shaped support members used to seat the housing 26 in a proper position in the support structure so that the light will be focused at the input ends of the light guides. In addition, the grooves 50 may be supported to hold the glass housing 26 in place as the arc tube 26 and base 44 are mounted in the housing so that the reflectors and the arc tube are precisely positioned to provide a maximum light output.

Figure 3:
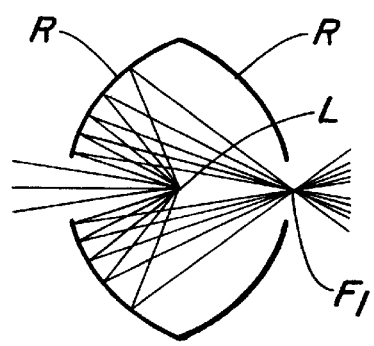
FIG. 3 is a schematic cross sectional view of a prior art reflector having a second focus at the wall of the reflector.
Figure 4:
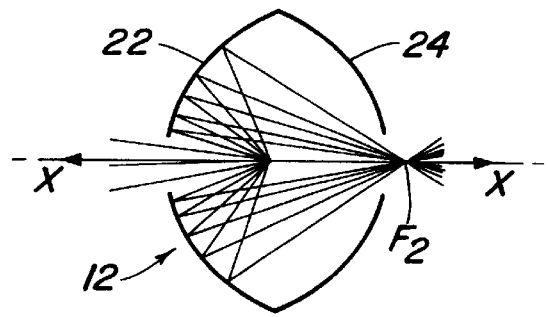
FIG. 4 is a schematic cross sectional view of a reflector having a second focus moved outside the wall of the reflector according to the invention.

FIGS. 3 and 4 illustrate one advantage of the present invention in that a change of shape of the reflectors R of FIG. 3 to the shape of the reflectors 22, 24 of FIG. 4 changes the second focus of the reflectors to a location outside the light source module. In FIG. 3, the first reflector R focuses the light from the light source L at a focus point $F_1$ which is located approximately in line with a surface of the second reflector. Thus, with the reflector configuration of FIG. 3, couplers of the light guides must be positioned within the openings in the reflectors to collect the reflected light. This requires that one or both of the light guide couplers be removed from the openings in the reflector prior to replacement of the light source module.

The reflectors 22, 24, illustrated in FIG. 4, are shaped to focus the reflected light from the light source 20 at a focus point $F_2$ which is located outside of the light source module 12. Therefore, the couplers 16 of the light guides may be located at the focus $F_2$ of the reflector which is outside of the module and the module may be replaced while the light guides remain in a fixed position. For this configuration, the peak collection angle for light which would enter an input face of a light guide is on the order of approximately fifty degrees (50°) with respect to the optical axis X. At this relatively high angle, light rays do not propagate through many optical fibers and much of the light would be lost. In order to prevent this loss, a coupling member, such as a tapered coupling, is used.

In contrast to the relatively high collection angle of the configuration of FIG. 4, the light module of FIGS. 1 and 2 including the windows 30 has a peak collection angle on the order of approximately thirty-five degrees (35°) with respect to the X axis. With this smaller collection angle, a straight coupler may be used rather than an expensive tapered coupler.

Figure 5:
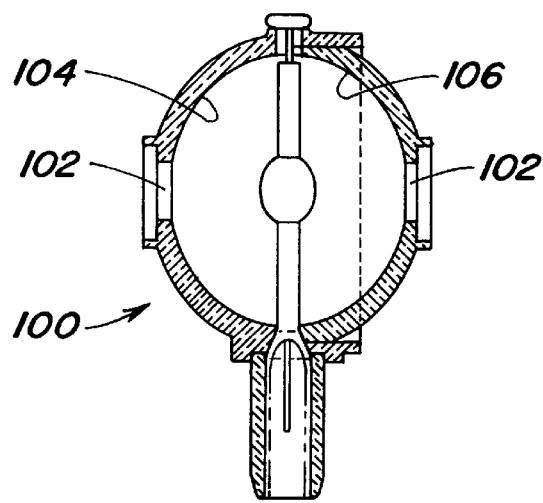
FIG. 5 is a cross sectional view of an alternative embodiment of the light module according to the present invention.

An alternative embodiment of the present invention having the reflector configuration of FIG. 4 is illustrated in FIG. 5. The light module 100 of FIG. 5 includes two openings 102 extending all the way through the glass of the ellipsoidal reflectors 104, 106 in place of the windows 30 in the embodiment of FIG. 1. Since the windows which act as a lens have been eliminated, the ends of the optical light guides will include tapered coupling members (not shown) which perform an angle area conversion to allow the light rays to propagate through the optical fibers. Light rays entering the input faces of the tapered coupling members at a large angle over a small area can be converted to light rays at the output faces of the coupling members at smaller angles and over a larger area. Tapered coupling members of the type employed in the FIG. 5 embodiment are known to those in the art.

FIGS. 6–8 illustrate a preferred manner of mounting the light module. Particularly, a support ring 110 is located in concentric arrangement about each window or lens. The ring is molded into the outer surface of the glass housing and the ring and thereby the module is removably received in a mounting member including a split yoke assembly 112a, 112b within an external enclosure 114. The yoke assembly assures precise alignment of the module or housing relative to the input ends of the light guides. Thus, the light guides are secured to the enclosure 114 by a fastener assembly 116, which properly orients the light guides. The module is then mounted via the yoke assembly which is, in turn, mounted in a desired position relative to the enclosure. Thus, the rings and yoke assembly allow accurate alignment of the module relative to the light guides and still permit the module to be easily serviced or replaced without disturbing the remaining components of the lighting system. It will also be understood that the yoke assembly can be used as the sole manner of mounting and properly aligning the module relative to the light guides, or may be used in conjunction with the base as described above.

The light source 20 for use in the light modules 12 and 100 is preferably an arc tube high brightness light source, capable of providing a light output of 4000 lumens from an arc gap of approximately 2.5 mm. An example of an acceptable arc tube light source is the Light Engine™ light source Model LE60 available from GE Lighting. Other types of high brightness lamps may also be used including high brightness incandescent lamps.

While the invention has been described in detail with reference to a preferred embodiment thereof, it will be apparent to one skilled in the art that various changes can be made, and equivalents employed without departing from the spirit and scope of the invention.

What we claim as new and desire to secure by Letters Patent of the United States is:

1. A lighting apparatus for providing light to remote locations, the lighting apparatus comprising:
    a replaceable housing;
    a light source contained in the housing;
    first and second reflectors arranged in the housing to receive light from the light source and direct the light to two focal points located outside of the housing;
    first and second windows located in openings in the first and second reflectors for changing an angle of the light passing out of the housing;
    a light distribution system including input ends located outside the housing for receiving light from the light source which has passed through the first and second windows, the light distribution system delivering the light to locations remote from the housing; and
    a mounting member removably receiving the replaceable housing at a position in which the input ends of the light distribution system will receive the light which has passed through the first and second window without the need to reposition the light distribution system during replacement of the housing.

2. The lighting apparatus of claim 1, wherein the input ends of the light distribution system are fixed.

3. The lighting apparatus of claim 1, wherein the housing is a glass housing, and the first and second reflectors are each formed by a reflective coating on an interior ellipsoidal surface of the glass housing.

4. The lighting apparatus of claim 3, wherein the first and second windows are each defined by a portion of the glass housing adjacent an opening in the reflective coating along an optical axis of the lighting apparatus.

5. The lighting apparatus of claim 1, wherein the light source is an arc tube.

6. The lighting apparatus of claim 1, wherein the first and second windows are negative lenses.

7. The lighting apparatus of claim 1, wherein the light source is fixed in the housing, and is replaceable with the housing, and the mounting member includes a socket configured to receive a ceramic base.

8. The lighting apparatus of claim 1, wherein first and second rings are molded in an outer surface of the housing, the first ring being concentric with the the first window and the second ring being concentric with the second window.

9. The lighting apparatus of claim 1, wherein a ceramic base is affixed to the housing in a precise orientation to the light source and to the housing.

10. The lighting apparatus of claim 1, wherein the light source is fixed in, and replaceable with, the housing and the mounting member is a yoke which holds the housing.

11. A light collection and distribution system comprising:
a light source;
a first ellipsoidal light collector member and a second ellipsoidal light collector member disposed in a joined manner so as to cooperatively surround the light source, the first light collector member having a first optical focal point at the light source and a second optical focal point beyond an exterior surface of the second light collector member, and the second light collector member having a first optical focal point at the light source and a second optical focal point beyond an exterior surface of the first light collector member;
an opening allowing light to pass through each of the first and second light collector members along an optical axis of the light collector members; and
first and second light guides disposed entirely outside and spaced from the first and second light collector members such that the light collector members are thermally isolated from the light guides, said first and second light guides each having an input face disposed to receive light collected by the first and second light collector members.

12. The light collection and distribution system of claim 11, wherein the light source and the first and second collector members are fixed together by a base member and form a single replaceable unit.

13. The light collection and distribution system of claim 11, wherein the first and second light guides include couplers.

14. A light collection and distribution system comprising:
a light source;
a first ellipsoidal light collector member and a second ellipsoidal light collector member disposed in a joined manner so as to cooperatively surround the light source, the first light collector member having a first optical focal point at the light source and a second optical focal point beyond an exterior surface of the second light collector member, and the second light collector member having a first optical focal point at the light source and a second optical focal point beyond an exterior surface of the first light collector member;
openings allowing light to pass through each of the first and second light collector members alone an optical axis of the light collector members;
first and second light guides disposed entirely outside and spaced from the exterior surface of the first and second light collector members, said first and second light guides each having an input face disposed to receive light collected by the first and second light collector members; and,
a negative lens in each of the openings which decreases an angle of the light exiting the openings with respect to an optical axis extending through the openings to direct the light into the input faces of the respective first and second light guides.

15. A light collection and distribution system comprising:
a light source;
a first ellipsoidal light collector member and a second ellipsoidal light collector member disposed in a joined manner so as to cooperatively surround the light source, the first light collector member having a first optical focal point at the light source and a second optical focal point beyond an exterior surface of the second light collector member, and the second light collector member having a first optical focal point at the light source and a second optical focal point beyond an exterior surface of the first light collector member;
an opening allowing light to pass through each of the first and second light collector members along an optical axis of the collector members; and
first and second light guides disposed entirely outside and spaced from the first and second light collector members, said first and second light guides each having an input face disposed to receive light collected by the first and second light collector members, the first and second light guides being fixed in a support structure including a mounting member for removably receiving the light source and the first and second light collector members.

16. A module dual-port light engine comprising:
a one piece transparent housing member having two substantially identical opposing ellipsoidal internal surfaces:
a reflective coating substantially covering each of the ellipsoidal internal surfaces except for an opening at a center of each of the ellipsoidal surfaces;
a negative lens formed in a wall of the transparent housing member at the opening in each of the ellipsoidal surfaces for focusing light at a point outside of the transparent housing member;
an arc tube fixed within the transparent housing member at a first focal point of each of the ellipsoidal surfaces;
a base fixing the arc tube within the transparent housing member and providing an electrical connection to a light socket; and
a locating ring formed on an exterior of the transparent housing member around each of the negative lenses for replaceable mounting the housing member to a mounting member.

17. The light engine of claim 16, wherein the one piece transparent housing member is formed of an ultraviolet absorbing glass material.

18. A module dual-port light engine comprising:

a one piece transparent housing member having two substantially identical opposing ellipsoidal internal surfaces;

a reflective coating substantially covering each of the ellipsoidal internal surfaces except for an opening at a center of each of the ellipsoidal surfaces;

a negative lens formed in a wall of the transparent housing member at the opening in each of the ellipsoidal surfaces for focusing light at a point outside of the transparent housing member;

an arc tube fixed within the transparent housing member at a first focal point of each of the ellipsoidal surfaces; and a base fixing the arc tube within the transparent housing member and providing a mechanical and electrical connection to a light socket, the base completely surrounding and securing one end of the arc tube in the housing member.

19. The light engine of claim 18, wherein the base includes an annular electrical contact and a shielding ring which shields the electrical contact from light emitted by the arc tube.

20. A light collection and distribution method comprising:

emitting light from a light source;

reflecting the emitted light by two opposed ellipsoidal reflectors;

passing the reflected light through two windows along an optical axis of the reflectors which receive the reflected light and decrease an angle of the light which respect to an optical axis extending through the windows;

collecting the light which has passed through the windows in two light guides which are fixed outside of the two opposed reflectors; and removing and replacing a module containing the light source and reflectors without moving the light guides.

21. The light collection and distribution method of claim 20, wherein infrared light passes through the two ellipsoidal reflectors.

22. The light collection and distribution method of claim 20 wherein ultraviolet light is prevented from passing through the windows by one of absorption and reflection of the ultraviolet light by the windows.

* * * * *